US009579967B2

(12) United States Patent
Resch et al.

(10) Patent No.: US 9,579,967 B2
(45) Date of Patent: Feb. 28, 2017

(54) HYDRAULIC DRIVE FOR A MOTOR VEHICLE AND METHOD FOR ITS OPERATION

(71) Applicant: MAN Truck & Bus AG, München (DE)

(72) Inventors: Franz-Georg Resch, Türkenfeld (DE); Reinhard Ittlinger, Oberschneiding (DE); Ludwig Füchsle, München (DE); Thomas Reiter, Eching (DE)

(73) Assignee: MAN TRUCK & BUS AG, Munich (DE)

( * ) Notice: Subject to any disclaimer, the term of this patent is extended or adjusted under 35 U.S.C. 154(b) by 0 days.

(21) Appl. No.: 14/921,396

(22) Filed: Oct. 23, 2015

(65) Prior Publication Data

US 2016/0114670 A1    Apr. 28, 2016

(30) Foreign Application Priority Data

Oct. 24, 2014   (DE) .................. 10 2014 015 809

(51) Int. Cl.
*B60K 7/00* (2006.01)
*B60B 27/00* (2006.01)
*B60B 35/02* (2006.01)

(52) U.S. Cl.
CPC ......... *B60K 7/0015* (2013.01); *B60B 27/0015* (2013.01); *B60B 35/02* (2013.01); *B60K 2007/0038* (2013.01); *B60K 2007/0092* (2013.01); *B60Y 2200/142* (2013.01); *B60Y 2200/143* (2013.01); *B60Y 2200/20* (2013.01)

(58) Field of Classification Search
USPC .................................................. 180/65.51
See application file for complete search history.

(56) References Cited

U.S. PATENT DOCUMENTS

| 3,606,601 | A | * | 9/1971 | White | F04C 2/104 418/61.3 |
| 3,770,075 | A | * | 11/1973 | Vegners | B60K 7/0015 180/308 |
| 3,969,950 | A | * | 7/1976 | Rau | B60K 17/14 180/305 |
| 4,043,226 | A | * | 8/1977 | Buuck | B60K 17/046 180/247 |
| 4,162,713 | A | * | 7/1979 | Heitman | B60K 7/0015 180/242 |
| 4,181,042 | A | * | 1/1980 | Rau | F16H 3/54 180/255 |

(Continued)

FOREIGN PATENT DOCUMENTS

DE        26 23 757 A1    12/1977
DE        299 24 730 U1    4/2005
(Continued)

*Primary Examiner* — Erez Gurari
(74) *Attorney, Agent, or Firm* — Lucas & Mercanti, LLP

(57) ABSTRACT

A device for a hydraulic wheel drive of a motor vehicle includes a wheel flange; a stub axle; and a rotary piston wheel drive configured and designed to introduce and receive a torque at the wheel flange. An active intervention of the rotary piston wheel drive is designed to be able to be switched on and decoupled. The present invention ensures that the vehicle can drive over rough tracks in the off-road sector. In addition the device can be engaged to recover braking force.

10 Claims, 3 Drawing Sheets

(56) References Cited

U.S. PATENT DOCUMENTS

| | | | | |
|---|---|---|---|---|
| 4,606,428 | A * | 8/1986 | Giere | B60K 17/14 |
| | | | | 180/307 |
| 6,129,169 | A * | 10/2000 | Skirde | B60K 17/105 |
| | | | | 180/305 |
| 6,302,233 | B1 | 10/2001 | Okamuro et al. | |
| 6,598,694 | B2 * | 7/2003 | Forster | B60K 7/0015 |
| | | | | 180/305 |
| 8,215,430 | B2 * | 7/2012 | Thomson | B60K 7/0015 |
| | | | | 180/305 |
| 9,216,648 | B2 * | 12/2015 | Ishizuka | B60K 17/043 |
| 9,309,955 | B2 | 4/2016 | Schubert | |
| 2008/0083580 | A1 | 4/2008 | White | |
| 2013/0094986 | A1 | 4/2013 | Prigent | |

FOREIGN PATENT DOCUMENTS

| | | |
|---|---|---|
| DE | 10 2011 013769 A1 | 9/2012 |
| FR | 2 998 225 A1 | 5/2014 |
| WO | 2011128556 A1 | 11/2011 |

* cited by examiner

HYDRAULIC DRIVE FOR A MOTOR VEHICLE AND METHOD FOR ITS OPERATION

CROSS-REFERENCE TO RELATED APPLICATIONS

The present application claims priority of DE 10 2014 015 809.8 filed Oct. 24, 2014, which is incorporated herein by reference.

BACKGROUND OF THE INVENTION

The invention concerns a hydraulic wheel drive for a motor vehicle, in particular for trucks, and particularly preferably for heavy goods vehicles or buses. An operating method for such motor vehicles is also given.

For many applications, it is necessary or at least useful to operate a motor vehicle both in the off-road sector and in the on-road sector. The off-road sector is characterized in particular by dirt roads such as usually occur on construction sites or in forests. The on-road sector is characterized in particular by asphalted roads, in particular for long-distance traffic. In the off-road sector, situations often occur in which the motor vehicle, because of the loose ground, cannot create sufficient traction, in particular with a single-axle drive as is normal for on-road vehicles, and becomes stuck. To this end, known off-road vehicles are fitted with a mechanical all-wheel drive system which normally comprises a primary mechanical drive unit. Such a drive unit (e.g., drive train) is normally arranged behind the engine, i.e., downstream in the direction of the power flow or force transmission. This drive unit comprises at least the gearbox, cardan shafts and mechanically driven axles, and transmits the mechanical power generated by the engine to the axles or wheels of a vehicle.

BRIEF SUMMARY OF THE INVENTION

An object of the present invention is to provide a device for a hydraulic wheel drive of a motor vehicle that allows the motor vehicle to be configured for operation in both the off-road sector and the on-road sector.

According to an embodiment of the invention, a device for a hydraulic wheel drive of a motor vehicle comprises at least:
  a wheel flange;
  a stub axle; and
  a hydraulic rotary piston wheel drive configured and designed to introduce and receive a torque at the wheel flange, wherein an active intervention of the rotary piston wheel drive is designed to be able to be engaged and decoupled.

The hydraulic rotary piston wheel drive serves to propel the motor vehicle or support a mechanical drive system. Here the wheels are brought into rotation by a fluid pressure generated by a pump. The vehicles according to an embodiment of the invention have two drive units. As well as the primary mechanical drive unit, the motor vehicle has a further drive unit for hydrostatic drive of a wheel or an axle.

The motor vehicle is particularly preferably a motor vehicle licensed for road use for goods transport, e.g., a tractor for a semi-trailer or a heavy goods vehicle which may optionally tow a trailer. It may however also be used for transport of persons (e.g., a bus). The motor vehicle preferably has a maximum speed which is at least greater than or equal to 60 kph (kilometers per hour). The invention does not concern vehicles with a maximum speed of less than 60 kph, for example industrial trucks (excavators) or tractors.

The motor vehicle has a plurality of wheels which can be driven via a wheel flange. The wheel flange may for example be bolted to a rim carrying the tire, or be designed integrally with the wheel. The wheel or wheel flange is arranged on a stub axle on which the vehicle superstructure is mounted. The stub axle may here be arranged rotatably about a so-called king pin and hence steerably. The device according to the invention furthermore comprises a rotary piston wheel drive via which a torque can be transmitted to the wheel flange. The torque produced by the rotary piston wheel drive results from the introduction of the hydraulic fluid under pressure into the rotary piston wheel drive. The rotary piston wheel drive comprises a chamber in which the piston turns with a shaft which emits a torque. Thus the rotary piston wheel drive may furthermore comprise a rotating piston and an outer ring arranged inside a housing and sealed towards the outside. A pressure chamber is formed between the piston and the chamber, via which a peripheral pressure field is produced by the introduction and discharge of hydraulic fluid, setting the piston in rotation. The emittable torque is determined by the pressure supplied, and the rotation speed is determined via the volume flow of the fluid. The achievable wheel rotation speed and wheel torque can be matched to the application via the swept volume, which is determined structurally by the size of the pressure chamber.

In a preferred embodiment of the device, the rotary piston wheel drive is configured on the principle of a roller system.

A roller system may be a hydraulic rotary piston drive in which a moveable, annular rotary piston moves with an outer toothing geometry in orbit in a fixed outer ring. The outer ring itself has an inner toothing on which the piston can roll or slide. The inner toothing of the outer ring may for example have one tooth more than the outer toothing of the rotary piston, so that a pressure chamber can form in the resulting space. The center of the piston may move on a circular track concentrically to the center of the chamber, wherein the rotary piston lies on one side on the chamber wall and hence can seal this. The outer ring with inner toothing may here stand still and the hydraulic fluid be transferred under control into the pressure chamber via an oil flow distributor (slider valve). The rotary piston may roll eccentrically over the toothing. In a roller system, part of the geometry of the outer ring may be formed by hydrodynamically mounted rollers which can run with the rotary movement of the rotary piston at the contact point. In this way, due to the reduced friction between the moving parts, the efficiency is increased in comparison with a rigid inner geometry and the hydraulic gap losses are minimised because of the mutual contact of the parts. The torque generated by the circulating pressure field and the rotation speed can be transmitted via a short cardan shaft to a centrally rotating output shaft. The centrally rotating output shaft may be connected couplably to a wheel flange. Such a wheel drive may be operated both in forward and in reverse motion, depending on the pressure application.

When the rotary piston wheel drive described is engaged from the decoupled state, it is particularly advantageous that here there is no engagement shudder—as occurs for example in a radial piston drive with rollers which hit the roller track from idle in order to activate the drive—but the torque is introduced gently. This serves to increase comfort by reducing noise and protecting the mechanical components from impact loads.

Also, harsh acceleration of the wheel flange or connected wheel may be suppressed by this effective geometry of the rotary piston drive. The rotation speed and torque transmitted may thus be adapted precisely to the ground conditions.

When the rotary piston wheel drive is decoupled, it is no longer carried with the movement of the wheel flange. This means that the moving components stand still and a far smaller quantity of hydraulic fluid passes into the rotary piston wheel drive than is the case when the drive system is engaged.

The active intervention of the rotary piston wheel drive may be decoupled or engaged hydraulically, mechanically and/or magnetically. In one embodiment, a form-fit engagement takes place, e.g., by axially slidable pins or face splines. In a further embodiment, a mechanical or hydraulic system may be constructed in the manner of a conventional friction clutch. In this further variant, on engagement a friction coating is pressed against a corresponding surface. In yet a further embodiment, an electromagnetic engagement, either a surface is pressed, a form-fit body, e.g., a pin is moved, or a magnetorheological fluid solidified via a switchable magnetic field in order to achieve an active engagement.

The proposed device has the advantage that in engaged state, it can be used in the off-road sector, wherein only a slight power loss is induced in decoupled state.

Because of the possibility of decoupling the rotary piston wheel drive, the wear thereon is reduced, preventing the entire vehicle from being stranded if the rotary piston motor can no longer rotate, e.g., because of a defect. In addition, the decoupled rotary piston wheel drive does not constitute a co-rotating mass, so the fuel consumption of such a motor vehicle is comparable to that of a motor vehicle in which the device according to the invention is not fitted.

In an advantageous embodiment of the device, the rotary piston wheel drive is connected to the wheel flange and can be pivoted relative to a wheel suspension or the longitudinal axis of the motor vehicle.

In a particularly advantageous embodiment of the device, the rotary piston wheel drive is connected to the wheel flange and can pivot relative to a rigid axle of the motor vehicle.

The rotary piston wheel drive may be integrated in the wheel part of a rigid axle with pneumatic or leaf springs of the motor vehicle for goods transport. The rotary piston wheel drive integrated in the wheel part of the rigid axle can pivot relative to the rigid axle. The wheel flange may be configured to steer the motor vehicle. Wheel parts in the sense of the present invention are components which can pivot about a steering axis (center of king pin) and which perform the function of wheel mounting, receiving the brake system and steering arms, and guidance of the wheel/tire. Components of the wheel part are usually the wheel hub, wheel bearing, stub axle (axle journal), steering arms and control arms, wheel brake units (drum or disc brakes).

To generate a torque or receive a torque in the wheel flange, flexible hydraulic lines may be guided to the pivotable wheel flange with the rotary piston wheel drive.

It is possible also to integrate the drive described in the wheel part of a stub axle suspended individually on the chassis for each wheel, e.g., in a double wishbone axle. Also, the hydraulic pressure fluid may be supplied via a mechanical rotary supply on the pivot axis. The small construction size, low weight and simple supply to the rotary piston wheel drive allow particularly advantageous use on steerable axles of the vehicle, in which the normal truck axle loads, track widths and steering geometries can be retained.

In a further advantageous embodiment of the device, the rotary piston wheel drive is connected to the wheel flange without a translation ratio. In devices for generating the necessary wheel drive torque at a low wheel rotation speed, (torque) increase or reduction systems such as a mechanical center drive or outer planet set on the wheel may be deemed necessary. With the device proposed here, the use of a translation ratio is not necessary. In particular, the rotary piston wheel drive may be connected directly to the wheel flange, wherein a conventional disc wheel can be used. In heavy goods vehicles, a suitable torque-rotation speed profile is achieved by the wheel diameter. In this way the construction size and complexity of the rotary piston wheel drive can be kept very low. Furthermore, by suitable choice of wheel diameter of a motor vehicle, a suitable ratio can be achieved between torque and rotation speed acting on the rotary piston wheel drive.

In a further advantageous embodiment of the device, a hydraulic fluid may be supplied and discharged via the stub axle. By supplying and discharging a hydraulic fluid via the stub axle, advantageously an existing component is used so there is no need to redesign a conventional motor vehicle. In particular, conventional on-road motor vehicles can later be equipped with this device at low cost.

In a further aspect, a method is proposed for operating a motor vehicle in connection with the device according to the invention, wherein the rotary piston wheel drive is activated for braking and acceleration. Accordingly, the rotary piston wheel drive can both generate a torque and receive a torque.

On braking, the hydrostatic rotary piston wheel drive can receive a torque acting from the outside via the wheel. This torque absorption allows the wheel flange or connected wheel to be braked. This enables the regenerative use of braking energy, since the rotary piston wheel drive can be used or operated as a pump for a fluid, in particular the hydraulic fluid. The hydraulic pressure may also be used for an electric generator unit which can be used e.g., to charge the vehicle battery. In addition or alternatively, a pressure accumulator for the hydraulic fluid can be filled.

On acceleration by the rotary piston wheel drive, it is particularly advantageous that there is no shuddering rotary movement, but the torque is introduced gently. A shuddering rotary movement of the connected wheel can be suppressed by braking the rotary piston wheel drive at high rotation speeds. A rotary piston is arranged in the rotary piston wheel drive and moved in orbit via the hydraulic fluid. The rotary piston here slides relative to an outer ring which is arranged concentrically to the rotation center of the wheel and may be firmly connected thereto. This sliding relative movement between the rotary piston and the outer ring can prevent a sudden rotary movement. In this way, the rotation speed and the transmitted torque may be adapted precisely to the ground conditions. To avoid shuddering movements, the fluid flow may be choked in a suitable or controllable manner. In a similar fashion to the end position damping in hydraulic pistons, the fluid flow is choked before reaching the end position in order to allow the piston to approach the end positions gently before the cylinder and the piston make hard contact. In addition, gas storage elements (hydraulic pressure accumulators) may be used to reduce shuddering movement changes.

In a further advantageous embodiment of the method, the rotary piston wheel drive may be used to recover braking energy. The rotary piston wheel drive may here act as a pump for the hydraulic fluid.

In this way, the rotary piston wheel drive may also be used or operated with reversed force flow, as a pump for a fluid. If a torque is transmitted from the outside, e.g., via the wheel, to the rotary piston wheel drive, the hydraulic fluid is delivered in the manner of a pump under generation of a pressure. This leads to a torque which counters the torque from the outside and thus brakes the wheel. Further hydraulic elements may also be operated with the hydraulic pressure produced.

Furthermore, the wheel flange or connected wheel may be equipped with a braking device which is fixedly connected to the wheel flange, e.g., a pneumatically or hydraulically activatable disc or drum brake. Thus the legal conditions for licensing of such a vehicle for road traffic are fulfilled.

In a further advantageous embodiment of the method, the rotary piston wheel drive may be decoupled as a function of the speed of the motor vehicle. The rotary piston wheel drive may be engaged or decoupled manually at any time, or automatically as a function of the speed. If the speed is below the limit speed on corresponding ground, the vehicle could become stuck. By engaging the rotary piston wheel drive, a torque and a speed-optimised force transmission to the ground are achieved. If the limit speed is exceeded, the vehicle is unlikely to become stuck and the engagement of the rotary piston wheel drive can be eliminated. The automatic decoupling may be prevented manually if necessary for particular applications of the motor vehicle. With this method, the fuel consumption of the vehicle is kept as low as possible without the need for activation by the vehicle driver. It is also advantageous here if the rotary piston wheel drive automatically re-engages when the speed drops below the limit speed. The use of such a method is advantageous in particular on large off-road areas with portions which can be driven in the same manner as an on-road sector.

In a further aspect of the invention, the use of the device for motor vehicles with a maximum speed of greater than or equal to 60 kph is proposed. In motor vehicles which have a maximum speed greater than or equal to 60 kph, the direct or immediate braking effect which can be produced by a rotary piston wheel drive is not sufficient, at least for legal licensing under the ECE Directive (Economic Commission for Europe). Also, the speeds achievable with the drive cannot be achieved with a rotary piston wheel drive for speeds of at least 60 kph. For these purposes, it is particularly advantageous to use the device proposed because this offers the advantages of all-terrain use combined with the benefits of, in particular, a single-axle driven motor vehicle in the on-road sector.

In a further aspect of the invention, a motor vehicle is described which is configured for off-road operation and for on-road operation at speeds of at least 60 kph, wherein a hydraulic rotary piston wheel drive is arranged in at least two wheels and can be engaged and decoupled during travel.

The features listed individually in the claims may be combined in any arbitrary, technologically sensible manner and be supplemented by explanatory situations from the description and details from the figures, wherein further variants of the invention are shown.

BRIEF DESCRIPTION OF THE DRAWINGS

The invention and the technical field will be explained below in more detail with reference to the figures. The figures show particularly preferred exemplary embodiments, to which however the invention is not restricted. In particular it is pointed out that the figures and in particular the size ratios shown are merely diagrammatic. The drawings show.

DETAILED DESCRIPTION OF THE PREFERRED EMBODIMENTS

Figure 1:
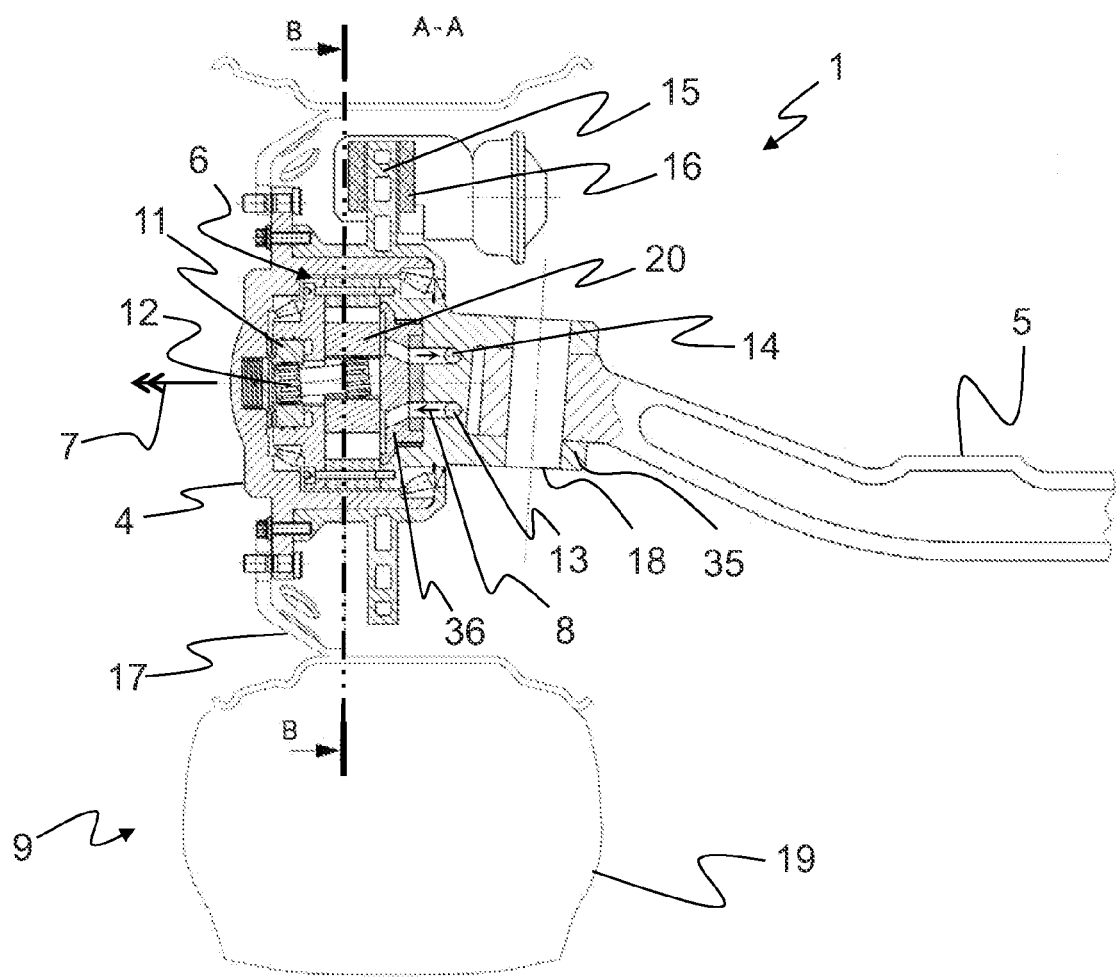
FIG. 1 a device with a rotary piston wheel drive arranged in a wheel in cross section, FIG. 2 a device with a rotary piston wheel drive in a steering axle in top view, FIG. 3 a rotary piston drive (roller system) in cross section, FIG. 4 a motor vehicle with a hydraulic wheel drive.

FIG. 1 shows in cross section the device 1 with a rotary piston wheel drive 6 which is arranged in a wheel flange 4. The rotary piston wheel drive 6 is connected pivotably to the rigid axle 5 by a king pin 18. The vehicle superstructure (not shown here) may be arranged on the rigid axle 5 via a suspension link with pneumatic or leaf springing. A rotary piston 20 is arranged in the rotary piston wheel drive 6 and moved in orbit via the hydraulic fluid 8. The hydraulic fluid 8 is supplied via the line 13 and discharged via the return line 14, which are arranged in an oil flow distributor 36 in a stub axle 35 connected to the king pin 18. The rotary piston 20 is connected via a short cardan shaft 12 or similarly acting unit to a clutch 11 for torque transmission. Here the clutch 11 shown is a hydraulically activated clutch. When the clutch 11 is connected to the wheel flange 4, a torque 7 generated by the rotary piston 20 is transmitted to the wheel flange. The wheel flange 4 is connected to the disc wheel 17 which, together with the tire 19, forms the wheel 9. The wheel flange 4 is furthermore fixedly connected to a brake which is here shown as an example as a disc brake with a brake disc 15 and brake pads 16. An embodiment with a drum brake would also be conceivable. FIG. 1 is a depiction of section plane A-A as defined in FIG. 2. FIG. 1 furthermore shows the section plane of the depiction in FIG. 3 (B-B).

Figure 2:
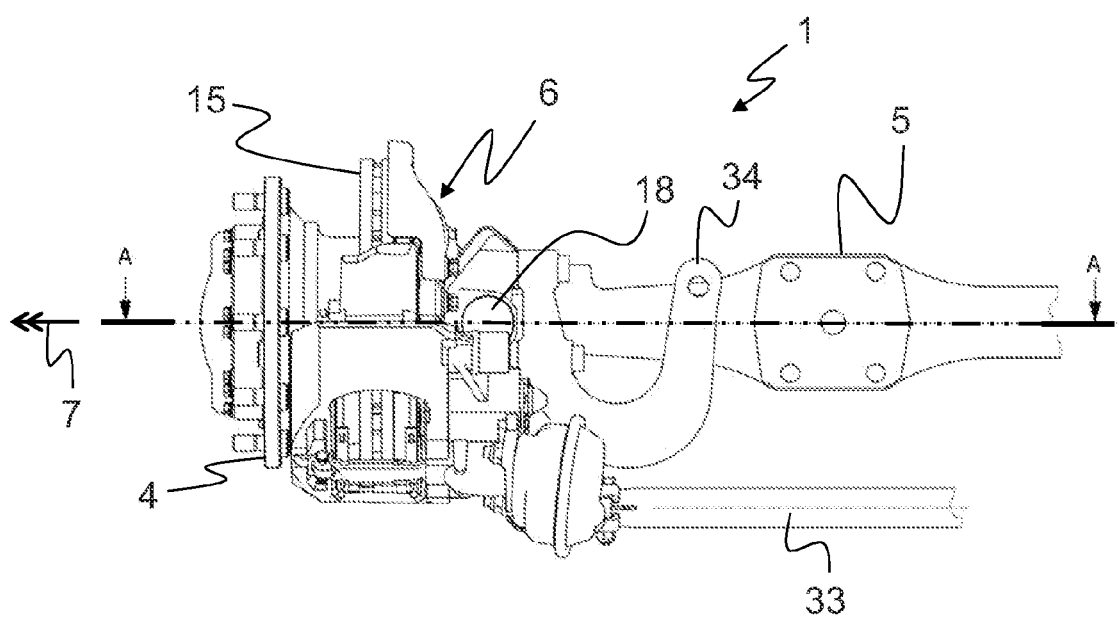

FIG. 2 shows the arrangement of the device 1 in top view, and defines the position of the side view of the depiction in FIG. 1 (A-A). The rotary piston wheel drive 6 is connected pivotably to the rigid axle 5 via the king pin 18 and is steerable via a track rod 33 and a steering arm (a sickle arm is shown) 34. Opposite this, the rotary piston drive 6 is connected to the wheel flange 4 so that a torque 7 can be transmitted to a wheel 9 (not shown) or a disc wheel 17. The rotary piston wheel drive 6 is depicted surrounded by a brake disc 15 which is configured for operation of a motor vehicle 3 (not shown). The motor vehicle may be configured for the transport of persons or goods, with a maximum permitted speed of greater than 60 kph.

Figure 3:
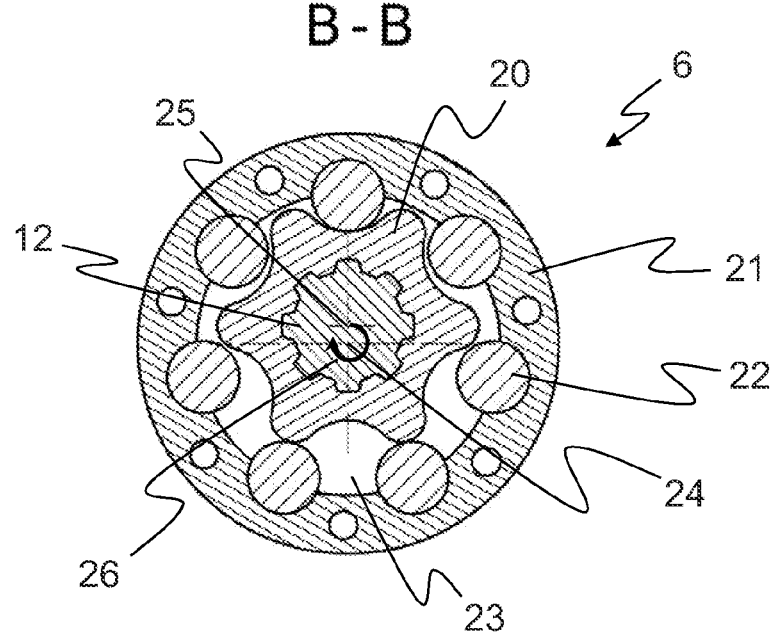

FIG. 3 shows a rotary piston wheel drive 6 in cross section. The position of the section is shown in FIG. 1 by line B-B. An outer ring 21 is arranged concentrically to the rotation center 24 and is configured to receive the rollers 22. The rollers 22 are mounted hydrodynamically in the outer ring 21 and form part of the inner geometry of the outer ring 21. The rotary piston 20 with rotary piston center 25 is arranged eccentrically to the rotation 24. The rotary piston 20 is connected by form fit to the cardan shaft 12. Due to the geometry of the rotary piston 20 and the outer ring 21, a peripheral chamber 23 of changeable volume is formed between the rotary piston 20 and the outer ring 21, in which the rotary piston 20 is moved along the circular track 26 concentrically to the rotation center 24 due to the pressure distribution occurring in the hydraulic fluid 8.

Figure 4:
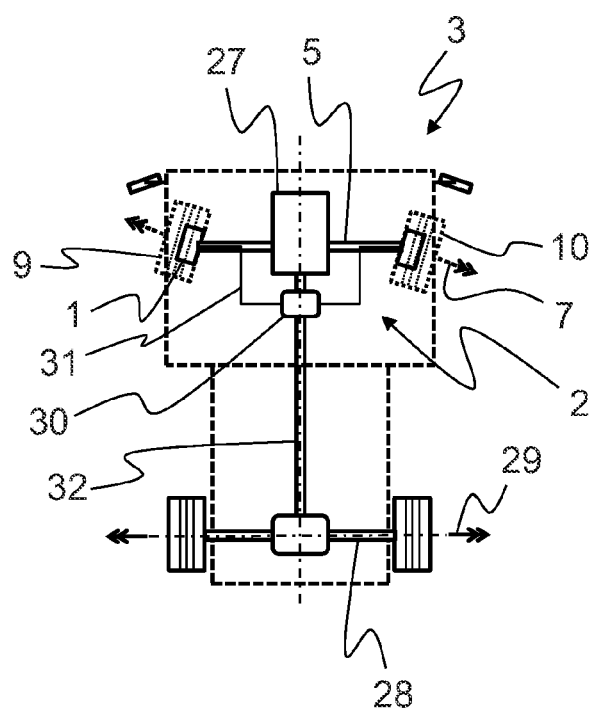

FIG. 4 shows a motor vehicle 3 with a hydraulic wheel drive 2. The hydraulic wheel drive 2 comprises the device 1 which is received fully in the enveloping geometry of the left wheel 9 and right wheel 10. The left wheel 9 and the right wheel 10 are connected to the motor vehicle 3 via the rigid axle 5. In this example, a drive unit 27 is shown which drives a driven axle 28 via a conventional output shaft 32 and emits an output torque 29. In the example shown, a pump 30 is also driven by the output shaft 32 and the pressure produced is transmitted to the device 1 via the lines 31. In this way, the torque 7 which can be engaged or decoupled is transmitted via the left wheel 9 and right wheel 10. The output via the driven axle 28 can also be disconnected during operation of the device 1 if required.

The present invention allows the vehicle to be able to drive over rough tracks in the off-road sector, wherein the device according to the invention can be disengaged in the on-road sector. In addition, the device can be engaged to recover braking force.

LIST OF REFERENCE NUMERALS

1 Device
2 Wheel drive
3 Motor vehicle
4 Wheel flange
5 Rigid axle
6 Rotary piston wheel drive
7 Torque
8 Hydraulic fluid
9 Left wheel
10 Right wheel
11 Clutch
12 Cardan shaft
13 Supply line
14 Return line
15 Brake disc
16 Brake pad
17 Disc wheel
18 King pin
19 Tire
20 Rotary piston
21 Outer ring
22 Roller
23 Chamber
24 Rotation center
25 Rotary piston center
26 Circular track
27 Drive unit
28 Driven axle
29 Output torque
30 Pump
31 Line
32 Output shaft
33 Track rod
34 Steering arm (shown as sickle arm)
35 Stub axle
36 Oil flow distributor

What is claimed is:

1. A device for a hydraulic wheel drive of a motor vehicle, comprising:
   a stub axle;
   a wheel flange mounted rotatably on the stub axle; and
   a rotary piston wheel drive configured to engage with the wheel flange to introduce a torque to the wheel flange and receive a torque from the wheel flange, wherein the rotary piston on the rotary piston wheel drive is connected to the wheel flange without a translation ratio, and the rotary piston wheel drive is selectively engageable and decoupleable with the wheel flange.

2. The device according to claim 1, wherein the rotary piston wheel drive includes a roller system.

3. The device according to claim 1, wherein the rotary piston wheel drive is connected to the wheel flange and can pivot relative to a rigid axle of the motor vehicle with the wheel flange.

4. The device according to claim 1, wherein the stub axle includes lines for supplying and discharging a hydraulic fluid to the rotary piston wheel drive.

5. The device according to claim 1, wherein the rotary piston of the rotary piston wheel drive is arranged radially inside an outer diameter of the wheel flange and between axial ends of the wheel flange.

6. A method for operating a motor vehicle with a device for a hydraulic wheel drive of a motor vehicle, the device comprising a stub axle; a wheel flange mounted rotatably on the stub axle; and a rotary piston wheel drive configured to engage with the wheel flange to introduce a torque to the wheel flange and receive a torque from the wheel flange, wherein the rotary piston wheel drive is selectively engageable and decoupleable with the wheel flange, the method comprising the steps of activating the rotary piston wheel drive for braking and activating the rotary piston drive for acceleration.

7. The method according to claim 6, wherein during the step of activating the rotary piston for braking includes operating the rotary piston wheel drive as a pump for the hydraulic fluid and using the rotary piston to recover braking energy.

8. The method according to claim 6, further comprising the step of decoupling the rotary piston wheel drive as a function of the speed of the motor vehicle.

9. The method according to claim 6, wherein the rotary piston wheel drive is used in a motor vehicle with a braking speed of at least 60 kph.

10. A motor vehicle configured for off-road operation and for on-road operation at speeds of at least 60 kph, comprising a hydraulic rotary piston wheel drive according to claim 1 arranged in at least two wheels, each of the hydraulic rotary piston wheel drives is engageable and decoupleable during travel.

* * * * *